(No Model.)
M. COHEN.
ROACH TRAP.
No. 254,800. Patented Mar. 14, 1882.
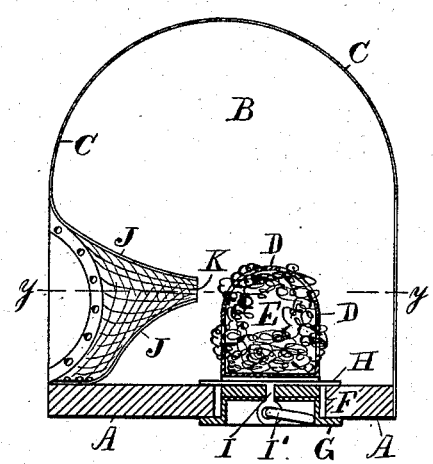
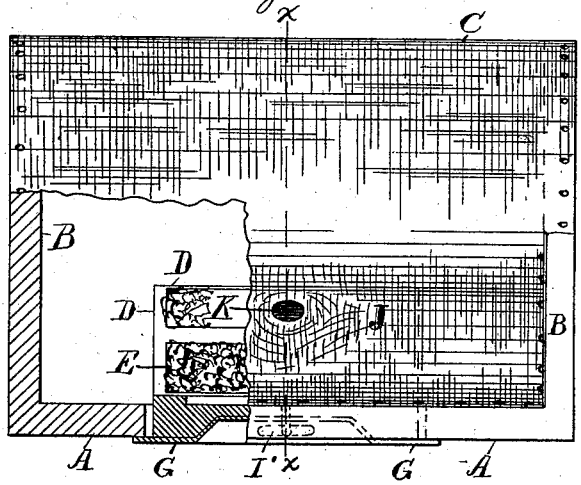
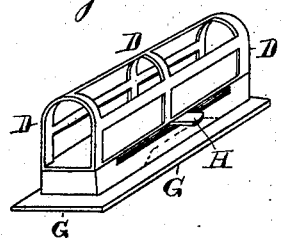
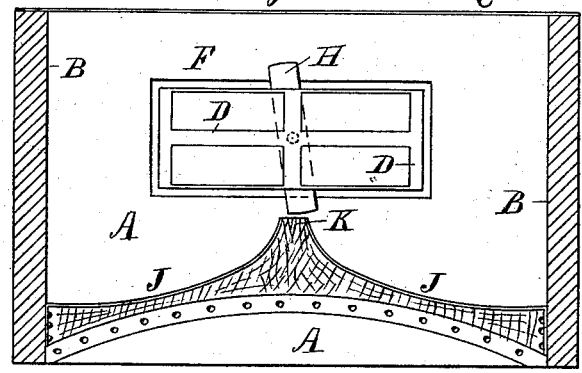
Attest:
Caspar W. Morris
J. G. Morris
Inventor
Myer Cohen, per
Thos. S. Crane, Atty.

UNITED STATES PATENT OFFICE.

MEYER COHEN, OF NEWARK, NEW JERSEY, ASSIGNOR OF ONE-HALF TO SAMUEL COHEN, OF SAME PLACE.

ROACH-TRAP.

SPECIFICATION forming part of Letters Patent No. 254,800, dated March 14, 1882.

Application filed December 21, 1881. (No model.)

*To all whom it may concern:*

Be it known that I, MEYER COHEN, a citizen of the United States, residing in the city of Newark, county of Essex, and State of New Jersey, have invented certain new and useful Improvements in Roach-Traps, fully described and represented in the following specification and the accompanying drawings, forming a part of the same.

My invention relates to an improvement in roach-traps; and it consists in the construction shown and described.

My invention will be understood by reference to the annexed drawings, in which Figure 1 is a side view of the trap with a part of the covering-net removed to show the bait-box. Fig. 2 is a section of the same on line $x\ x$ in Fig. 1, and Fig. 3 is a sectional plan on line $y\ y$ in Fig. 2. Fig. 4 is a perspective view of the bait-box detached from the trap.

A is the floor of the trap.

B B are ends projecting upward and sustaining a covering of arched shape, C. The cover is of wire-net, that the bait inside may be readily smelled.

D is the bait-box, consisting of an oblong skeleton case, of sheet metal, adapted to receive a sponge, E, moistened with molasses and water or other suitable bait.

A hole, F, is formed in the bottom of the trap to insert and remove the box, and a flange, G, is formed upon the box to close the hole when the box is locked into its place by a cross-bar, H, which bears upon the inside of the floor A, and is turned by a spindle, I, and ring I', extended to the outside of the flange.

The bait-box is a skeleton-cylinder of tin, so as to expose the sponge E freely, and the only inlet to the trap is formed by a depression, J, of the net C at one side, terminated by a nozzle, K, in close proximity to the bait.

The effect of the indentation or depression in the outside of the net is to afford the roaches a gradual approach to the bait in a direction leading to the aperture in the nozzle K.

From the interior of the cage the aperture appears at the end of a projecting nozzle, and as there is nothing to attract the insects toward that point when once inside they are all securely retained in the trap. A few minutes' exposure to the heat of an oven suffices to kill the insects without injury to the trap, and the removal of the box D then permits the inside to be cleaned or emptied.

From the above description it will be seen that the essential features of my invention are the trap formed of netting or perforated material, having a depression in one side, combined with a nozzle having an opening in close proximity to a bait-box, the latter being removable for renewal and for cleaning out the trap.

The floor and ends of the trap may be made of wood or metal, as preferred, and the covering made of perforated sheet metal instead of wire-netting, if desired.

I am aware that insect-traps have been made with wire-netting covers, as in Patents Nos. 145,791 and 115,215, and that openings are not new in the side of such a trap. I am also aware that a sponge has been used to apply moisture to a poisonous mixture in a trap, as in Patent No. 170,505, of 1875. I do not therefore claim any of these features separately; but, having shown the relation of the nozzle K to the depression J in the side of the trap and the arrangement of the sponge at the end of the nozzle inside the trap,

I claim as follows:

The roach-trap constructed, as herein shown and described, with wire-netting C, having the depression J formed in one side and provided with a nozzle, K, the opening F in the floor A, and the skeleton bait-box D, provided with sponge E and secured in the opening F, substantially as and for the purpose described.

In testimony whereof I have hereunto set my hand in the presence of two subscribing witnesses.

MEYER COHEN.

Witnesses:
 FRED. RUM,
 F. F. GUILD.